March 17, 1959  E. S. BROMBERG  2,877,779
CASE FOR CONTACT LENSES
Filed Feb. 4, 1957  3 Sheets-Sheet 1

INVENTOR.
EDWIN S. BROMBERG
BY
CORBETT, MAHONEY & MILLER, ATTYS.

March 17, 1959     E. S. BROMBERG     2,877,779
CASE FOR CONTACT LENSES

Filed Feb. 4, 1957     3 Sheets-Sheet 2

INVENTOR.
EDWIN S. BROMBERG
BY CORBETT, MAHONEY & MILLER, ATTYS.

March 17, 1959 E. S. BROMBERG 2,877,779
CASE FOR CONTACT LENSES
Filed Feb. 4, 1957 3 Sheets-Sheet 3

*INVENTOR.*
EDWIN S. BROMBERG
BY
CORBETT, MAHONEY & MILLER, ATTYS.
BY

United States Patent Office 2,877,779
Patented Mar. 17, 1959

2,877,779

CASE FOR CONTACT LENSES

Edwin Smith Bromberg, Columbus, Ohio

Application February 4, 1957, Serial No. 638,142

4 Claims. (Cl. 134—99)

My invention relates to a case for contact lenses. It has to do, more particularly, with a liquid-tight case in which contact lenses may be placed when not in use and in which they may be cleansed or rinsed with a suitable solution or may be immersed in a suitable protective solution until they are removed for wearing.

There have been cases for contact lenses provided in the past and these usually are of a screw cap storage type. These prior art cases are of the dry type and merely provide means for holding the dry lenses. From the time the wearer of contact lenses opens this prior art type of case to take the lenses out, he has to be on constant guard against damage or loss to the lenses. Since contact lenses are very small, thin and lightweight, it is easy to damage them or to drop the lenses and lose them. The wearer must be careful not to scratch the edge of the lens against these prior art cases when he removes them. When he has the lenses out of the case, for sanitary reasons he must apply a cleansing solution over the lenses from a bottle which he must carry with him at all times and then he must go to a source of rinsing water, such as a faucet, to rinse the cleansing solution off the lenses and apply water to the lenses for lubricant purposes before positioning in the eyes. He must be very careful when positioning each lens under a faucet to prevent the lens from slipping from his fingers and going down the drain. When positioning the lens on the cornea of the eye, he must be provided with a mirror to aid in positioning it. When he is through wearing the lens and removes it, he must again go to a water faucet to rinse the teardrops off, otherwise the lens will be stained by salts deposited therefrom. He then wipes the lenses dry and must worry about placing them exactly centered in the case so as not to pinch the lenses while screwing the cap on. Manufacturers of contact lenses recommend that the lenses should never be wiped dry but should be immersed in a suitable solution when not in use in order to preserve the polish. Since most people wear contact lenses for appearance' sake, very few immerse them when not in use because they wish to carry their lenses with them at all times.

One object of my invention is to provide a case for contact lenses which will support the lenses in such a manner as to preclude any damage thereto and which is of such a nature that the lenses can be readily positioned therein and be removed therefrom without damage thereto.

Another object of my invention is to provide a case for contact lenses which is liquid-tight and which is provided with a compartment in which the lenses are supported and other associated compartments for cleansing and immersing solutions with appropriate flow control valves for controlling the flow of liquids between the various compartments.

Other objects will be apparent.

In the accompanying drawings, I have illustrated the preferred embodiment of my invention.

Figure 1:
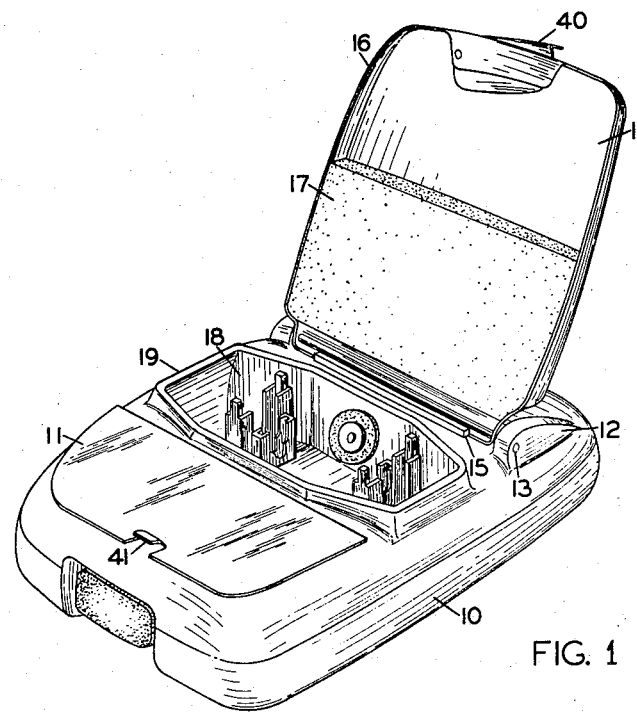
Figure 1 is a perspective view of a case for contact lenses made according to my invention and showing the hinged lid of the case opened for receiving the lenses.

With reference to the drawings, I have illustrated my invention as taking the form of a case for contact lenses which comprises an elongated relatively flat pack or body 10 which is made of suitable liquid-tight material, such as plastic. At one end, on the flat upper surface of the body 10, a mirror 11 is secured and this mirror is preferably of non-breakable material, such as metal. At the other end of the body 10, pivot lugs 12 are integrally formed and project upwardly therefrom for receiving the transverse hinge pin 13 which hinges the flat lid or cover 14 to the body. An integral stop rib 15 upstanding between the lugs 12 on the flat upper surface of the body 10 limits upward and rearward swinging of the lid 14.

Figure 2:
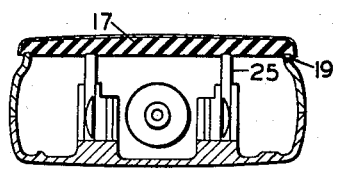
Figure 2 is a transverse vertical sectional view taken along line 2—2 of Figure 3 through the lens compartment with the lid of the case closed.
Figure 3:
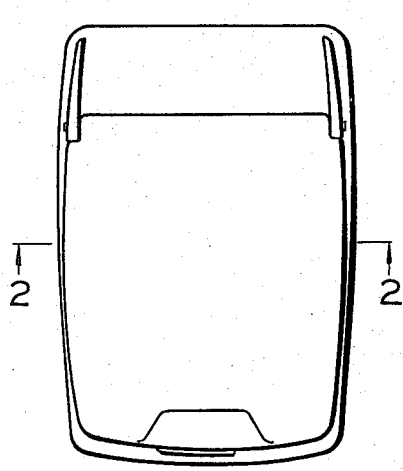
Figure 3 is a plan view of the case showing the lid closed.
Figure 4:
Figure 4 is a side elevational view of the closed case shown in Figure 3.

The lid 14 is made relatively flat but has a depending peripheral lip 16 formed therearound. Within this lip, adjacent the hinged end thereof, is a flat gasket 17 which is preferably composed of compressible rubber and is suitably bonded thereto. Intermediate the positions of the hinge lugs 12 and the mirror 11, that is, about midway of the length of the body 10, the top surface of the body is provided with a large access opening 18 which is surrounded by a gasket seat 19. This seat 19 is formed integral with the top surface of the obdy 10 and projects upwardly therefrom, its sealing edge lying in a flat plane. When the lid 14 is swung downwardly to close the access opening 18, the inner surface of the gasket 17 will firmly contact the sealing edge 19 as shown in Figure 2. This will effectively close the case with a liquid-tight seal.

Figure 5:
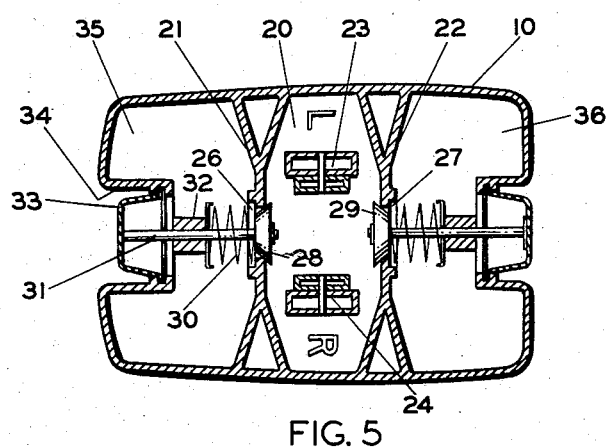
Figure 5 is a longitudinal sectional view taken through the case along line 5—5 of Figure 4.

The access opening 18 extends transversely of the body of the case and provides ready access to the lens-receiving compartment 20. This transverse compartment is formed intermediate the ends of the body 10, as shown in Figure 5, by a pair of liquid-tight transverse partitions 21 and 22, it being noted that these partitions are disposed outwardly towards the ends of the body 10 beyond the edges of the access opening 18. Within the compartment 20, supporting units 23 and 24 are provided for supporting contact lenses on edge. Each of these units is provided with a plurality of U-shape pockets of different sizes for receiving the lenses on edge, two pockets only being shown in each unit 23 and 24 but it being understood that any desired number of pockets may be provided. These pockets are so formed that liquid in the compartment 20 can readily wet each flat side of a supported lens. Each unit 23 or 24 is provided with upstanding lugs 25 which will project upwardly beyond a supported lens of the largest size so that it will contact the gasket 17 (Figure 2) and prevent any contact of the gasket with the lens.

The partition 21 is provided with a central opening 26 for passage of liquid and the partition 22 is provided with a similar opening 27. The opening 26 is controlled by a valve 28 and the opening 27 is controlled by a valve 29. The valves 28 and 29 are identical. Each valve is composed of flexible material such as rubber and is normally held seated on the inner edge of its associated opening by means of a compression spring 30 associated with a valve stem 31 that is slidably mounted in a sleeve 32 integral with the body 10. However, the valve may be unseated by pressure on a flexible button 33 which is disposed in a recess 34 in the outer end of the body 10. The button is of a skirted type so that it can be connected to the body 10 within the recess 34 with a fluid-tight seal, as indicated in Figure 5.

The partition 21 separates the lens compartment 20 from a compartment 35 which is adapted to contain a suitable liquid. Similarly, the partition 22 separates the lens compartment 20 from a compartment 36 which is adapted to contain a suitable liquid. To permit the flow of liquid between the compartments 20 and 35, the valve 28 is unseated. To permit the flow of liquid between the lens compartment 20 and the liquid compartment 36, the valve 29 is unseated. Either valve can be unseated by pressure applied to the button 33 provided therefor and the spring 30 will automatically reseat the valve when pressure is relieved.

As previously indicated, the lid 14 will close the body with a fluid-tight seal when it is swung downwardly so that the gasket 17 will contact the sealing edge 19 and be compressed thereagainst. To hold the lid 14 in such sealing position, a pivoted latch 40 is provided on the outer edge of the lid 14, as shown best in Figure 1. This latch 40 cooperates with an outwardly projecting keeper 41 which is carried by the body 10 adjacent the end opposite the position of the hinge lugs 12. When the lid is swung into closed position, the latch 40 can be engaged with the keeper 41 by an inward pivotal movement thereof and to open the case, the latch can be easily released from the keeper 41 by an outward pivotal movement.

Figure 6:
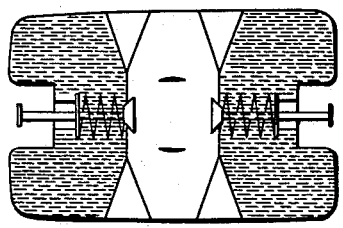
Figures 6 to 8 are diagrammatic views in longitudinal section showing how the valves of the case can be controlled to fill and empty various compartments thereof.

In the use of the case, the compartment 35 will be filled with one type of liquid and the compartment 36 with another type of liquid. For example, the compartment 35 may contain a cleansing solution and the compartment 36 may contain rinsing water. In filling these compartments 35 and 36 initially, the liquid is first placed in the lens compartment 20 and then the appropriate valve 28 or 29 is opened to allow the liquid to enter the proper compartment. This condition is illustrated in Figure 6 where the two end compartments 35 and 36 are filled with liquid and the intermediate lens compartment 20 is empty but has the lenses supported therein.

Figure 7:
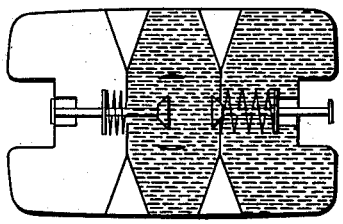
Figure 8:
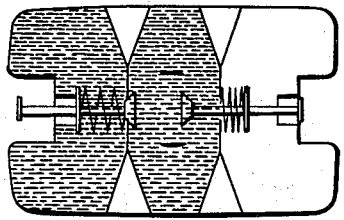

If it is desired to keep the lenses in the case for a period of time, as previously indicated, it is desirable that they be immersed in a liquid. For this purpose, the valve 28 can be opened and the compartment 20 can be filled with water from the compartment 35, as shown in Figure 7, by proper tipping of the case. On the other hand, if it is desired that the lenses supported in the compartment 20 be subjected to the cleansing solution, the valve 29 is opened and the cleansing solution is caused to flow from the compartment 36 into the compartment by proper tipping of the case, as indicated in Figure 8. Now, if it is desired to rinse the cleansing solution from the lenses in the compartment 20, the valve 29 is again opened and the cleansing solution is allowed to flow back into the compartment 36. Then, cleansing water may be flowed back and forth between the compartment 35 into the compartment 20 by opening the valve 28 and rocking the case.

It will be apparent from the above description that I have provided a simple, compact case for receiving and supporting contact lenses. The case is of such a nature that the lenses can be easily and quickly removed or replaced in the case. They will be so supported within the case in such a manner that no damage from the case to the lenses can occur. The lenses can be supported within the case for the necessary cleansing or wetting operations, and there is no danger of the lenses being dropped during these operations since they will be positioned in the case and these operations can be accomplished by a rocking movement of the case and proper operation of the valves from the exterior of the case. The case can be readily carried by the wearer and will always be available for storage of the contact lenses in the protective liquid whenever the lenses are removed by the wearer.

Various other advantages will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A case for supporting contact lenses comprising an elongated flat body of pack form, said body being divided by transverse partitions into a lens-receiving compartment and adjacent liquid-receiving compartments, valves for selectively controlling the flow of liquid between adjacent compartments, means for operating said valves from the exterior of the body, said lens-receiving compartment having an access opening at its upper side, and a closure member on the top of said body having sealing means for sealing said opening.

2. A case for supporting contact lenses according to claim 1 in which the closure member is a lid hinged to the top of the case, said access opening having an upstanding sealing rib therearound, and a compressible sealing member carried on the lower surface of said lid for engaging said sealing rib.

3. A case for supporting contact lenses according to claim 2 in which said body is divided into a central lens-receiving compartment and end liquid compartments, a valve being provided in each of the transverse partitions, and means at each end of the case for operating its respective valve.

4. A case for supporting contact lenses according to claim 3 in which each valve is provided with a reciprocable stem operated by a button at the end of the case, and a spring in the case on each stem for normally keeping its respective valve closed.

References Cited in the file of this patent

UNITED STATES PATENTS

| | | |
|---|---|---|
| 571,017 | Reeve | Nov. 10, 1896 |
| 845,804 | Martin | Mar. 5, 1907 |
| 1,872,864 | Yarcho | Aug. 23, 1932 |
| 2,327,721 | Konucik | Aug. 24, 1943 |
| 2,659,380 | Jackson | Nov. 17, 1953 |
| 2,674,757 | Keyes | Apr. 13, 1954 |

FOREIGN PATENTS

| | | |
|---|---|---|
| 474,758 | Great Britain | Nov. 5, 1937 |